US005781505A

United States Patent [19]
Rowland

[11] Patent Number: 5,781,505
[45] Date of Patent: Jul. 14, 1998

[54] SYSTEM AND METHOD FOR LOCATING A TRAJECTORY AND A SOURCE OF A PROJECTILE

[75] Inventor: Raymond J. Rowland, Noank, Conn.

[73] Assignee: The United States of America as represented by the Secretary of the Navy, Washington, D.C.

[21] Appl. No.: 954,094

[22] Filed: Oct. 14, 1997

[51] Int. Cl.⁶ ............................................. G01S 5/18
[52] U.S. Cl. ........................ 367/127; 367/124; 367/906
[58] Field of Search ............................. 367/118, 124, 367/127, 906

[56] References Cited

U.S. PATENT DOCUMENTS

| | | | |
|---|---|---|---|
| 3,341,810 | 9/1967 | Wallen, Jr. ......................... | 367/906 |
| 4,323,993 | 4/1982 | Soderblom et al. ................. | 367/127 |
| 5,241,518 | 8/1993 | McNeils et al. .................... | 367/127 |
| 5,258,962 | 11/1993 | Karlsen ............................. | 367/127 |

*Primary Examiner*—Ian J. Lobo
*Attorney, Agent, or Firm*—Michael J. McGowan; William F. Eipert; Prithvi C. Lall

[57] ABSTRACT

A projectile trajectory and source location system and method identifies, localizes, and displays a projectile trajectory relative to one or more stationary objects, such as buildings in an urban environment. The system includes a sensor array and trajectory location calculator that sense conditions generated by the projectile, such as an acoustic signature, and calculate a set of ranges to the trajectory. A ranging system and range comparison calculator measure ranges to one or more stationary objects and compare those ranges to the set of ranges to the trajectory. A display displays the trajectory relative to the stationary objects including unobstructed portions of the trajectory, obstructed portions of the trajectory and the located source of the projectile. A tracking system and dynamic reprocessor track the movement of an observer, dynamically reprocess the relative trajectory location, and update the display of the relative trajectory location in response to the observer's movement.

20 Claims, 5 Drawing Sheets

5,781,505

SYSTEM AND METHOD FOR LOCATING A TRAJECTORY AND A SOURCE OF A PROJECTILE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to systems for locating a trajectory and a source of a projectile and, in particular, to a system for locating a trajectory and a source of a projectile relative to one or more stationary objects and for dynamically reprocessing the relative trajectory location in response to movement of an observer.

(2) Description of the Prior Art

Systems for estimating the trajectory of a projectile, such as a bullet or other supersonic projectile, are well known. However, systems for determining the trajectory of a projectile often can not precisely locate the source of a projectile, particularly in battlefield or urban environments. A soldier or police officer needs, not only to identify the path and range of a sniper's fire, but to identify and track the location of the sniper.

Systems and methods for calculating the trajectory of a projectile traveling at supersonic speeds have typically used acoustic-based methods to detect the acoustic signature of the shock wave generated by the projectile, for example, as disclosed in U.S. Pat. No. 5,241,518, incorporated herein by reference. The shock wave created by a supersonic projectile is characterized by a sharp pressure increase followed by a generally linear decrease to a large negative in pressure, before rapidly returning to ambient pressure levels. This acoustic signature of the supersonic projectile is known as the N-wave due to its characteristic shape. The pressure amplitudes and arrival times of the N-wave at known sensor positions are functions of the distance or range to the trajectory of the projectile. Detecting the pressure amplitudes and the arrival times of the acoustic signature of the N-wave thereby provides data from which the range to and angle of the trajectory can be calculated.

This calculation, however, only provides the position, relative bearing and elevation angle of the trajectory but no location or identification of the source of the projectile. One way of determining the range to the source of the projectile is by detecting the arrival time of the muzzle blast generated when the projectile is fired. However, complex environments, such as urban settings, and noise suppression techniques, often make detection of the muzzle blast impossible. Without detection of the muzzle blast, existing projectile trajectory location systems have been unable to locate the source of the projectile.

SUMMARY OF THE INVENTION

One object of the present invention is to provide a system and method for locating a trajectory and a source of a projectile when no muzzle blast caused by firing the projectile can be detected.

Another object of the present invention is to determine and display a location of the trajectory of the projectile relative to one or more stationary objects from a viewpoint of an observer.

A further object of the present invention is to dynamically reprocess and update the display of the relative trajectory of the projectile in response to movement of the observer.

The present invention features a system and method for locating a trajectory and source of a projectile relative to one or more stationary objects. The system comprises at least one sensor for sensing conditions generated by the projectile as the projectile travels from the source. One type of sensor includes an acoustic sensor array that senses pressure changes caused by a shock wave generated by the projectile. Another sensor includes an optical sensor array.

A trajectory location calculator is responsive to the acoustic sensor, for calculating a set of ranges to the trajectory of the projectile based upon the conditions sensed by the acoustic sensor array. The set of ranges to the trajectory of the projectile represent an estimated trajectory location.

An active (or passive) ranging system is responsive to the trajectory location calculator, for determining a range to the stationary object(s) along the trajectory of the projectile. A range comparison calculator is responsive to the trajectory location calculator and the active/passive ranging system, for comparing the set of ranges to the trajectory and the ranges to the stationary objects to determine a relative trajectory location of the projectile relative to the stationary objects.

The preferred embodiment of the system further includes a display, responsive to the trajectory location calculator, for displaying the trajectory to an observer. The display is also responsive to the range comparison calculator, for displaying the trajectory relative to the stationary objects. The system further includes a heads-up display or a live video feed from the observer such that the trajectory is displayed relative to the stationary objects from the viewpoint of the observer.

The preferred embodiment of the system also includes a tracking system for tracking movement of the observer. A dynamic reprocessor is responsive to the range comparison calculator and the tracking system, for dynamically reprocessing the relative trajectory location and dynamically updating the trajectory on the display in response to the movement by the observer. In one embodiment, the tracking system includes a global positioning system (GPS) for tracking a change in location of the observer. The tracking system can also include a head tracking system for tracking head movement of the observer.

The method of locating the trajectory and the source of the projectile relative to one or more stationary objects comprises: sensing conditions generated by the projectile as the projectile travels from the source; calculating a set of ranges to the trajectory of the projectile using the sensed conditions; calculating ranges to the stationary objects along the trajectory of the projectile; and comparing the set of ranges to the trajectory and the ranges to the stationary objects to determine a trajectory location relative to the stationary objects and to determine the source of the projectile. Determining the source of the projectile includes determining a point along the trajectory where the range to the trajectory is substantially equal to the range to a stationary object.

The preferred method includes displaying the trajectory on a display after calculating the set of ranges to the trajectory, and preferably displaying the trajectory on a display relative to the stationary objects. Determining the relative trajectory location preferably includes determining an unobstructed portion of the trajectory along which the range to the trajectory is less than the range to the stationary objects, and determining an obstructed portion of the trajectory along which the range to the trajectory is greater than the range to a stationary object. Displaying the trajectory relative to the stationary objects preferably includes displaying the obstructed portion and unobstructed portion of the trajectory using different formats, for example, in different colors.

The method further includes the steps of: tracking the movement of an observer observing the trajectory on the display; and responsive to the movement of the observer, dynamically updating the display based on the movement of the observer. Tracking the movement of the observer includes tracking a change in the location of the observer with GPS and/or tracking head movement of the observer.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
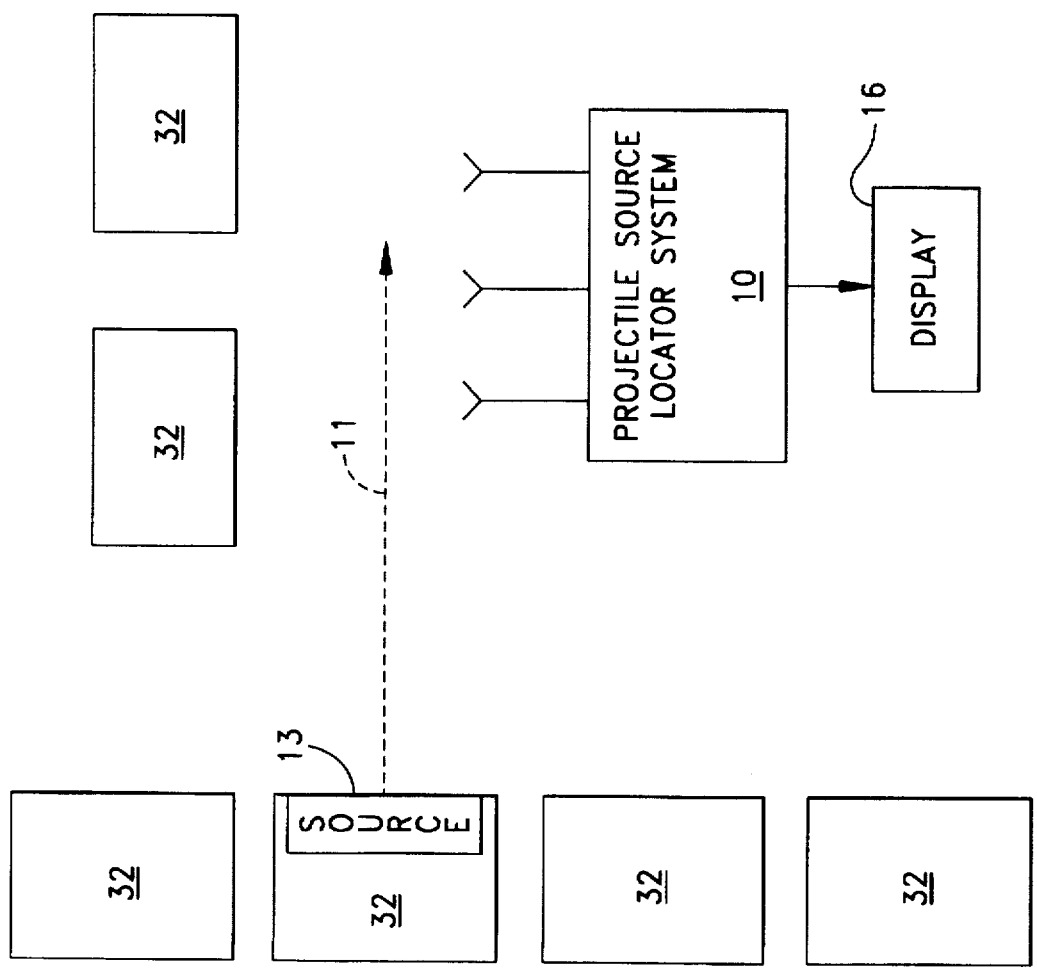
FIG. 1 is a block diagram illustrating an application of a system for locating a trajectory and a source of a projectile relative to one or more stationary objects according to the present invention.

Referring to FIG. 1, a projectile trajectory and source location system 10 operates to identify, localize, and display the trajectory 11 of a projectile and the source 13 from which the projectile has been launched or fired. According to the exemplary application of FIG. 1, the system 10 detects the acoustic signature of a bullet or other supersonic projectile that has been fired in a battlefield, urban area, or other similar environment. The system 10 locates and displays the trajectory relative to buildings, geological features, and/or other stationary objects 32 in the battlefield or urban environment. Locating the projectile relative to one or more stationary objects 32 will reveal the location of the source 13 of the projectile, if the projectile has been fired from the stationary object. The trajectory is shown on a display 16 to an observer, such as a police officer or soldier, attempting to locate the source of the projectile. The present invention contemplates using the system 10 to locate and display the trajectory of other types of projectiles in other types of environments.

Figure 2:
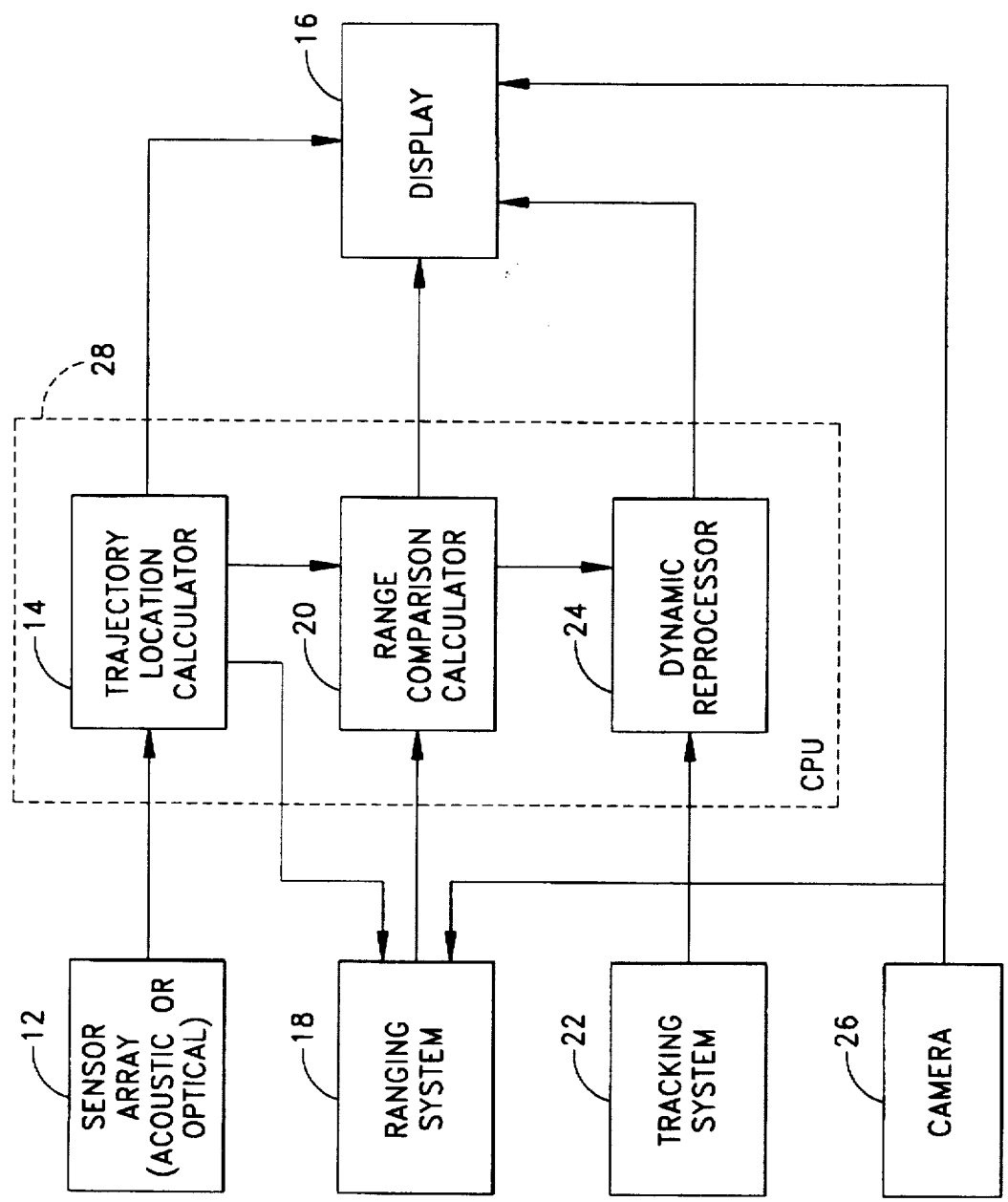
FIG. 2 is a block diagram of a system for locating a trajectory and a source of a projectile according to the present invention.

Referring now to FIG. 2, there is shown a block diagram of the projectile trajectory and source location system 10. System 10 includes a sensor array 12 which senses conditions generated by the projectile coupled to a trajectory location calculator 14. Sensor array 12 can include an array of acoustic sensors that sense the acoustic signature generated by the projectile. Using an acoustic array, one or more sensors or transducers detect the pressure changes caused by the N-wave of the projectile shock wave and record the inter-arrival times of the N-wave at the sensors. One type of acoustic array is disclosed in U.S. Pat. No. 5,241,518 or U.S. Pat. No. 5,258,962, incorporated herein by reference.

Trajectory location calculator 14 is responsive to the sensor array 12 to calculate the projectile trajectory. Trajectory calculator 14 receives the record of arrival times of the N-wave to each of the sensors in sensor array 12. A set of ranges from the sensors to an estimated trajectory of the projectile can be calculated based upon the arrival times at one or more of the sensors of the acoustic signature of the N-wave or other conditions sensed by the sensor array 12. This set of ranges, along with the relative positions of the sensors within array 12 can be used to generate an estimated location of the projectile trajectory including the relative bearing and elevation angle of the trajectory. The trajectory location calculator 14 does not provide an accurate indication of the location of the source of the projectile along the projectile trajectory.

The sensor array 12 is preferably disposed proximate the observer's location or on the observer such that a set of ranges to the projectile trajectory are calculated from the observer's location. If sensor array 12 is not located near the observer, trajectory location calculator 14 must translate the set of ranges to the trajectory such that the observer and sensor array 12 appear to be co-located at a common reference point. Preferably the common reference point is the same position as the location the observer such that the set of ranges to the trajectory are relative to the location of the observer.

The system 10 further includes a ranging system 18, to provide an in-situ measurement of ranges from the observer to one or more stationary objects that appear to intersect the trajectory, and a range comparison calculator 20 to determine the trajectory location relative to the stationary objects.

The ranging system 18 can be an active ranging system, a passive ranging system, or a combination thereof. An active ranging system emits a signal, such as an acoustic signal, radar, laser or other similar signals, which bounces off an object. The range to the object is determined based upon the propagation time of the signal. The ranging system 18 is responsive to the trajectory location calculator 14 to steer or direct the active ranging system 18 in a direction of the estimated trajectory calculated by the trajectory location calculator 14. The range to one or more of the stationary objects, such as buildings or geological features which appear to be along the trajectory are then measured. These measurements are then passed to range comparison calculator 20 for determination of the trajectory location relative to the stationary objects. A passive ranging system 18 calculates the range to a stationary object having a known location as the difference between the location of the object and the observer's current position, which may be known or obtained from a tracking system such as a global positioning system (GPS) or the like.

The range comparison calculator 20 is responsive to both the ranging system 18 and the trajectory location calculator 14 to determine the location of the trajectory relative to the stationary objects. Range comparison calculator 20 compares the ranges to the stationary objects received from ranging system 18 with ranges to the estimated trajectory generated by the trajectory location calculator 14. The range comparison calculator 20 calculates whether the range to the trajectory is less than, greater than, or equal to the range to the stationary object at that point along the trajectory. The range comparisons indicate whether the trajectory is unobstructed by the stationary object, obstructed by the stationary object, or intersecting with the stationary object. The intersection of the estimated trajectory with one of the stationary objects indicates the probable source (or termination) of the projectile trajectory.

Alternatively, a passive ranging system 18 is responsive to an image from camera 26 and the estimated location of the projectile trajectory from the trajectory location calculator 14 to identify the relative location of the estimated trajectory with respect to stationary objects in the image. In such an embodiment, passive ranging system 18 receives an image from camera 26, superimposes the estimated trajectory upon the image, and passes the superimposed image to range comparison calculator 20 for determination of the trajectory location relative to the stationary objects in the image received from camera 26. A solution for the estimated trajectory relative to the stationary objects in the image can be obtained given the bearing and elevation of the trajectory and the relative location of stationary objects within the image. The relative location of stationary objects can be determined by identifying the individual stationary objects and the associated edges for each.

Figure 3A:
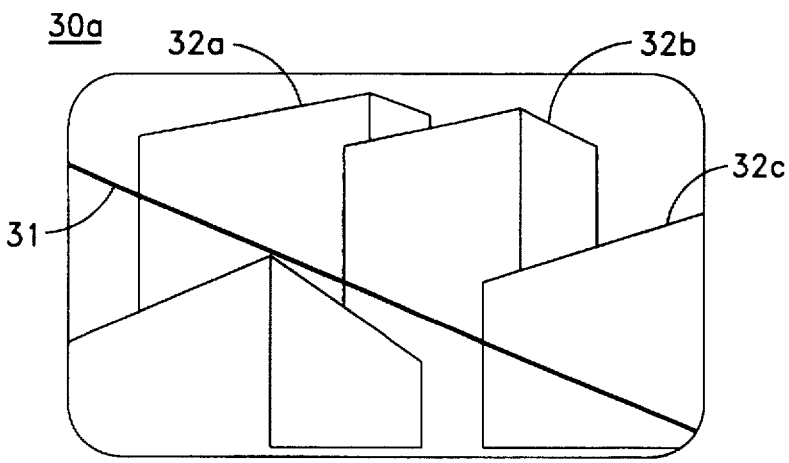
FIGS. 3A–3C are displays of a projectile trajectory relative to stationary objects using the system and method of the present invention.
Figure 3B:
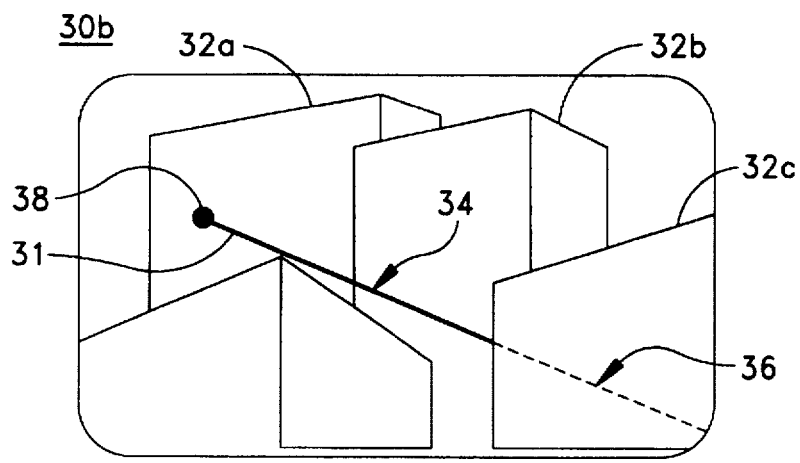
Figure 3C:
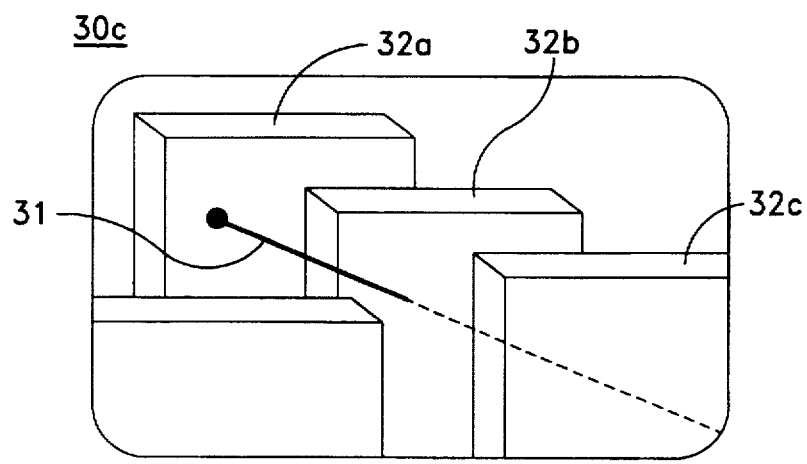

The system 10 further includes a display 16, such as a heads-up display or portable visual display system held on the head of a viewer, for displaying one or more images 30a–30c, FIGS. 3A–3C, of the trajectory and other trajectory information to the observer. The heads up display 16 can include a small cathode ray tube device which can be positioned within the viewer's field of vision. Alternatively, the heads up display 16 can include a liquid crystal display (LCD) device which can be positioned within the viewer's field of vision, a light transmissive LCD allowing the viewer to look through the screen, or a virtual raster image display device. In one example, the system 10 includes a camera 26, such as a helmet-mounted video camera, that provides a live video feed from the observer's location such that a "real world" view of the observer's surroundings is displayed.

The preferred embodiment of the system 10 also includes a system position tracking system 22, for tracking movement of the observer, and a dynamic reprocessor 24 for reprocessing the relative trajectory location and updating the display of the relative trajectory location in response to observer movement. One type of tracking system 22 includes a global positioning system (GPS) that tracks changes in location of the observer.

When the tracking system 22 detects that the observer has changed locations, the ranging system 18 determines ranges to the stationary objects from the observer's new location and the new range comparisons calculated by the range comparison calculator 20 are provided to the dynamic reprocessor 24, to reprocess the trajectory location relative to the stationary objects. The relative trajectory location is thereby "fine tuned" by intelligent repositioning of the observer and recalculation of range comparisons from alternative vantage points When a camera 26 is mounted near the observer's head, the tracking system 22 can include a head tracking system that tracks head movement of the observer. The camera 26 provides a live video feed of the observer's field of view and the displayed image of that field of view continuously changes with the head movement of the observer. When the tracking system 22 detects head movement of the observer, the dynamic reprocessor 24 correlates the head movement of the observer with the relative trajectory location and updates the display of the trajectory 31 to correspond with the observer's changing field of view.

The dynamic reprocessing can be achieved continuously or can be performed at the request of the observer after the observer has moved or repositioned. The present invention also contemplates using multiple observers to determine ranges to the trajectory and ranges to the stationary objects simultaneously from different perspectives to improve accuracy.

The trajectory location calculator 14, range comparison calculator 20, and dynamic reprocessor 24 are preferably implemented as software operating on a central processing unit (CPU) 28, such as a laptop or other portable system.

In operation, the display 16 is responsive to the trajectory location calculator 14, to provide an image 30a, FIG. 3A, of the estimated trajectory 31 superimposed over one or more stationary objects 32a–32c, such as buildings. The estimated trajectory 31 is superimposed or displayed across the one or more stationary objects 32a–32c within the field of view of the observer. The image 30a of the estimated trajectory 31 calculated by the trajectory location calculator 14 provides the observer with immediate feedback as to the estimated trajectory. However, this image 30a does not provide an accurate location of the trajectory relative to the one or more stationary objects 32a–32c and does not permit localization of the source of the projectile.

The display 16 is responsive to the range comparison calculator 20 to provide an image 30b, FIG. 2B, of the trajectory 31 relative to the stationary objects 32a–32c. If the range comparison calculator 20 determines that the range to the trajectory 31 along a portion of the trajectory is less than the range to the stationary objects 32a, 32b, that portion 34 of the trajectory 31 will be displayed as unobstructed. If the range comparison calculator 20 determines that the ranges to the trajectory 31 along a portion of the trajectory 31 are greater than the range to one or more of the stationary objects 32c, that portion 36 of the trajectory 31 will be displayed as being obstructed by the stationary object 32c.

If the range comparison calculator 20 determines that the range to the trajectory is substantially equal to the range to a stationary object 32a, this location 38 along the trajectory 31 is determined to correspond to the source (or termination) of the projectile and is displayed as the probable source of the projectile. The observer can then determine that the sniper or other source of the projectile is likely to be in or on the stationary object 32a at the point 38 where the trajectory 31 intersects the stationary object 32a.

The unobstructed portion 34, obstructed portion 36, and source location 38 of the projectile are preferably displayed in different formats on the display 16, for example, in different colors. The immediate display of the estimated trajectory 31 (FIG. 3A) is thereby modified to display the trajectory 31 relative to the one or more stationary objects 32a–32c and to identify the source 38 of the projectile (FIG. 3B).

In reponse to a change in the position of the observer, the dynamic reprocessor 24 updates the display 16 to provide an updated image 30c, FIG. 3C, that shows the trajectory 31 relative to the stationary objects 32a–32b in the observer's field of view at the new location. The observer is thereby provided with an updated display of the trajectory relative to the stationary objects as the observer moves around objects and towards an unobstructed view of the source of the projectile.

Figure 4A:
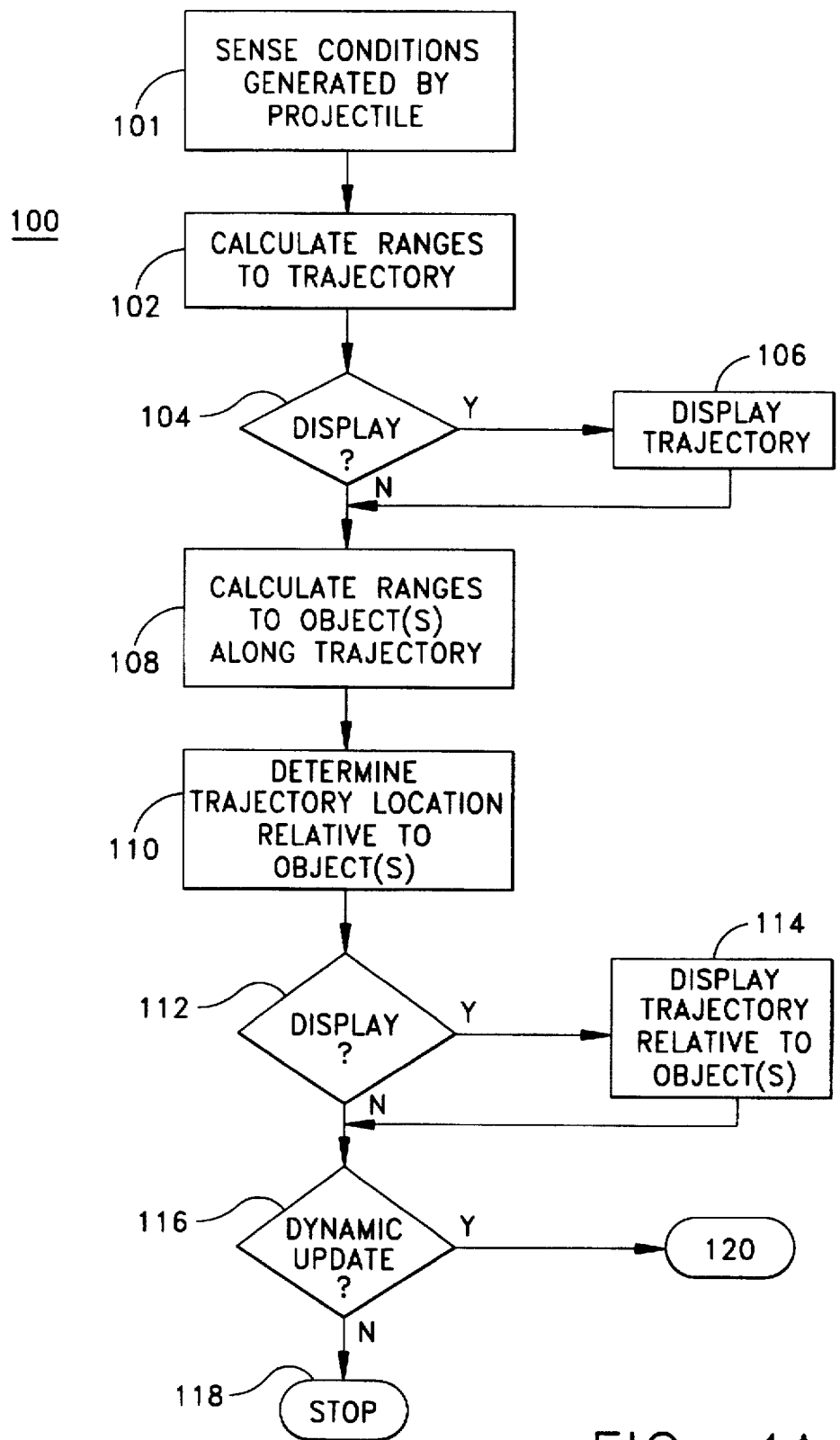
FIGS. 4A and 4B are a flow chart of the method for locating a trajectory and a source of a projectile, according to the present invention.
Figure 4B:
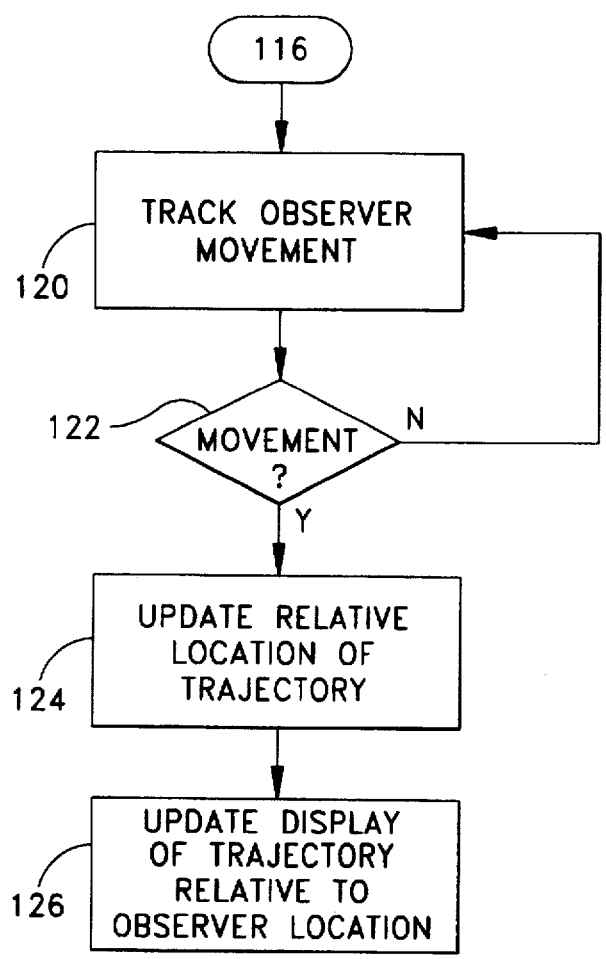

The method 100, FIGS. 4A–4B, of locating the trajectory and source of a projectile according to the present invention includes first sensing the acoustic signature or other condition generated by the projectile after the projectile has been launched or fired from its source, step 101. The conditions sensed by the sensors 12 are then used to calculate a set of ranges from the observer to the trajectory, step 102. If the observer wants to obtain immediate feedback as to the estimated trajectory, step 104, the observer can display the estimated trajectory, step 106.

To determine the relative trajectory location, the ranges from the observer to the one or more stationary objects are calculated along the line of the trajectory, step 108. By comparing the ranges to the trajectory and the ranges to the stationary objects, the trajectory location relative to the stationary objects is determined, step 110. If the observer wants to view the trajectory relative to the stationary objects, step 112, the display is modified to reflect the projectile trajectory relative to the stationary objects including the unobstructed and obstructed portions of the trajectory and the location of the source of the trajectory.

If the trajectory location does not need to be updated in response to the observer's movement, step 116, the process stops, step 118, and the observer analyzes the display of the trajectory relative to the stationary objects and observes and determines the source of the projectile from that display.

If the trajectory location must be dynamically updated, the observer's movement is tracked, step 120, FIG. 4B. If the observer has moved, step 122, the relative location of the trajectory will be updated, step 124, by measuring the ranges from the observer's new location to the stationary objects and by recalculating the range comparisons. The display of the trajectory relative to the stationary objects is then updated in response to the observer's movement, step 126, to show the trajectory relative to the objects in the observer's new field of view.

Accordingly, the system and method of the present invention localizes and displays a projectile trajectory and determines a source of the projectile even when a muzzle blast cannot be detected, such as in complex urban environments. The system and method also dynamically reprocesses and updates the display of the trajectory relative to the stationary objects in response to observer movement to more accurately determine the relative location of the trajectory and to facilitate location of the source of the projectile.

In light of the above, it is therefore understood that within the scope of the appended claims, the invention may be practiced otherwise than as specifically described.

What is claimed is:

1. A system for locating a trajectory of a projectile relative to at least one stationary object, said system comprising:

an acoustic sensor, for sensing conditions generated by said projectile;

a trajectory location calculator, responsive to said sensed conditions from said acoustic sensor, for calculating a set of ranges to said trajectory;

a ranging system, responsive to said trajectory location calculator, for determining a range to said at least one stationary object along said trajectory of said projectile; and a range comparison calculator, responsive to said trajectory location calculator and said ranging system, for comparing said set of ranges to said trajectory and said range to said at least one stationary objects for determining a trajectory location of said projectile relative to said at least one stationary object.

2. The system of claim 1 further including a display, responsive to said trajectory location calculator and said range comparison calculator, for displaying said trajectory relative to said at least one stationary object.

3. The system of claim 2 further including:

a tracking system, for tracking movement of an observer; and a dynamic reprocessor, responsive to said range comparison calculator and said tracking system, for reprocessing said trajectory location in response to said movement of said observer.

4. The system of claim 3 wherein said tracking system includes a global positioning system, for tracking a change in location of said observer, and wherein said dynamic reprocessor updates said trajectory of said projectile on said display in response to said change in location of said observer.

5. The system of claim 3 wherein said tracking system includes a head tracking system, for tracking head movement of said observer; and wherein said dynamic reprocessor dynamically updates said trajectory on said display in response to said head movement of said observer.

6. The system of claim 3 wherein said trajectory location calculator, said range comparison calculator, and said dynamic reprocessor are implemented on at least one central processing unit.

7. The system of claim 3 wherein said display includes a heads-up display held on a head of a viewer.

8. The system of claim 7 wherein said heads-up display includes a light transmissive liquid crystal display (LCD).

9. The system of claim 1 wherein said acoustic sensor comprises an array of pressure sensors, and wherein said conditions sensed by said acoustic sensor array include pressure changes caused by a shock wave generated by said projectile.

10. A method of locating a trajectory of and a source of a projectile relative to at least one stationary object, said method comprising the steps of:

sensing conditions generated by said projectile as said projectile travels from said source;

calculating a set of ranges to said trajectory of said projectile using said sensed conditions, said set of ranges to said trajectory representing a trajectory path;

calculating a range to said at least one stationary object along said trajectory of said projectile; and comparing said set of ranges to said trajectory and said range to said at least one stationary object, for determining a trajectory location relative to said at least one stationary object, and for determining said source of said projectile.

11. The method of claim 10 wherein determining said source of said projectile includes determining a point along said trajectory location where said range to said trajectory is substantially equal to said range to said at least one stationary object.

12. The method of claim 10 further including the step of displaying said trajectory on a display.

13. The method of claim 10 further including the step of, after comparing said set of ranges to said trajectory and said range to said at least one stationary object, displaying said trajectory on a display relative to said at least one stationary object.

14. The method of claim 13 wherein determining said relative trajectory location relative to said at least one stationary object includes determining an unobstructed portion of said trajectory along which said range to said trajectory is less than said range to said at least one stationary object.

15. The method of claim 14 wherein determining said relative trajectory location relative to said at least one stationary object further includes determining an obstructed portion of said trajectory along which said range to said trajectory is greater than said range to said at least one stationary object.

16. The method of claim 15 wherein displaying said trajectory relative to said at least one stationary object includes displaying said obstructed portion of said trajectory and said unobstructed portion of said trajectory using different formats.

17. The method of claim 13 further including the steps of:
tracking movement of an observer observing said trajectory on said display; and
responsive to movement of said observer, dynamically updating said trajectory on said display relative to said movement of said observer.

18. The method of claim 17 wherein the step of tracking movement of said observer includes tracking a change in location of said observer with a global positioning system.

19. The method of claim 17 wherein the step of tracking movement of said observer includes tracking head movement of said observer.

20. The method of claim 10 wherein the step of sensing conditions generated by said projectile includes sensing acoustic pressure changes caused by a shock wave generated by said projectile.

* * * * *